United States Patent
McKiernan

[15] 3,675,127
[45] July 4, 1972

[54] GATED-CLOCK TIME MEASUREMENT APPARATUS INCLUDING GRANULARITY ERROR ELIMINATION

[72] Inventor: Dennis Lester McKiernan, Lincoln Park, N.J.

[73] Assignee: Bell Telephone Laboratories, Incorporated, Murray Hill, N.J.

[22] Filed: Dec. 28, 1970

[21] Appl. No.: 101,477

[52] U.S. Cl. .........................................................324/186
[51] Int. Cl. ....................................G04f 9/00, G04f 11/06
[58] Field of Search ..............324/181, 186, 187, 188, 78 D, 324/78 Q; 328/109, 141

[56] References Cited

UNITED STATES PATENTS 3,553,582 1/1971 Gouillou ..............................324/186
3,541,448 11/1970 Nutt ....................................324/186

Primary Examiner—Alfred E. Smith
Attorney—R. J. Guenther and William L. Keefauver

[57] ABSTRACT

A precise measure of the time interval between the occurrence of first and second events is obtained by utilizing gated-clock time interval measurement apparatus. A plurality of clock pulses occurring during the interval between the events is counted. Errors in the time interval measurement are minimized by obtaining a measure of an interval between the first event and the first counted clock pulse and by obtaining a measure of an interval between the last counted clock pulse and the second event. Analog signals representative of the error intervals and the clock pulse count are combined to yield the desired time interval measurement.

4 Claims, 5 Drawing Figures

INVENTOR
D. L. McKIERNAN
BY Thomas Stafford
ATTORNEY

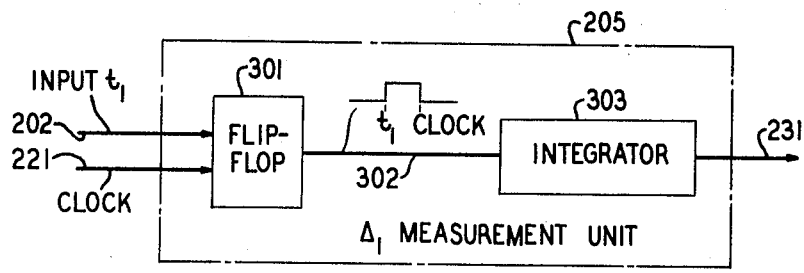
FIG. 3
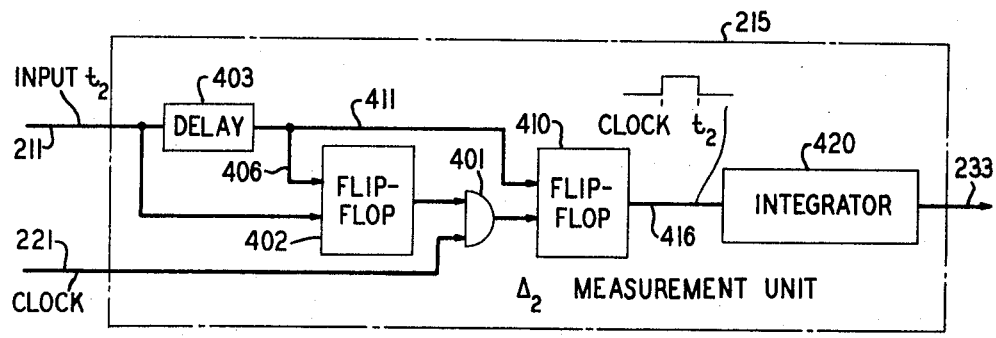
FIG. 4
FIG. 5
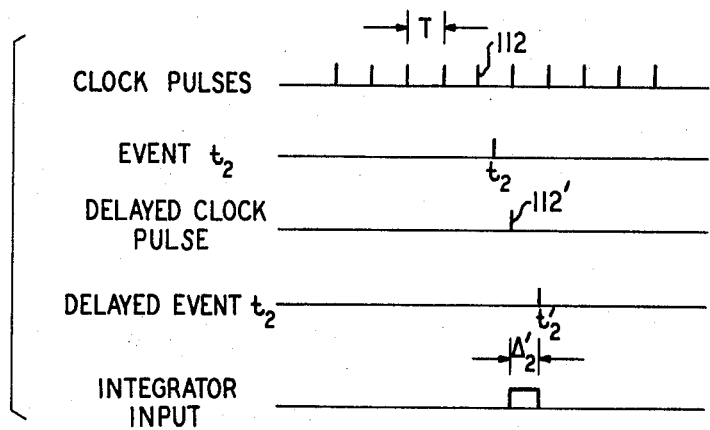

GATED-CLOCK TIME MEASUREMENT APPARATUS INCLUDING GRANULARITY ERROR ELIMINATION

GOVERNMENT CONTRACT

The invention herein claimed was made in the course of or under a contract with the Department of the Army.

BACKGROUND OF THE INVENTION

This invention relates to time interval measurement apparatus and, more particularly, to gated-clock time measurement apparatus including error elimination.

In many systems, it is essential to obtain a precise measure of the elapsed time between the occurrence of two events. Numerous techniques have been devised for this purpose. Typically, such time measurements are made by counting pulses generated by a precision oscillator during the interval between the events. This technique is commonly referred to as the gated-clock time interval measurement. Apparatus for obtaining gated-clock time measurements is briefly described by J. Millman and H. Taub in *Pulse, Digital and Switching Waveforms*, McGraw-Hill Book Company, Inc., New York, 1965 at pages 683–684.

The gated-clock measurement technique yields satisfactory results in many applications. However, errors result in such measurements when the events, which bound the interval to be measured, do not coincide exactly with the clock pulses being counted. These errors are commonly known as granularity errors.

Many techniques have been devised for minimizing such errors. In one technique the frequency of the oscillator is merely increased to decrease the interval between pulses. This approach is undesirable, however, because of the increase in the cost of the precision oscillator corresponding to the increase in frequency and because of the increased cost of the associated counting elements since they must count faster.

Another scheme for minimizing granularity errors utilizes the so-called vernier counting technique. Vernier counting, as the name implies, involves the use of a so-called vernier counter and a vernier oscillator in addition to a coarse counter and coarse oscillator. The vernier and coarse counters and oscillators are connected in a complex arrangement to obtain the desired time measurement. Typical vernier counting apparatus is also described beginning at page 683 of *Pulse, Digital and Switching Waveforms*, cited above. Vernier counting systems are undesirable for use in many applications because of their complexity and because of their cost.

SUMMARY OF THE INVENTION

It is, therefore, an object of this invention to minimize errors in gated-clock time interval measurements.

Another object of the invention is to simplify the design of error elimination apparatus used in gated-clock time measurements.

In accordance with this invention, these and other objects are accomplished in a gated-clock time interval measurement system that includes apparatus for minimizing granularity errors. Possible errors are minimized by obtaining an accurate measure of the error intervals, converting the error interval measurements into analog signals and combining the analog error signals with a signal representative of a number of clock pulses counted during the time interval being measured.

Specifically, typical gated-clock apparatus is utilized to count a number of precisely spaced clock pulses generated between the occurrence of a first event and a second event. A first possible error interval, occurring between the first event and the first counted clock pulse, is measured by setting a flip-flop with a signal representative of the first event and resetting the flip-flop with the first clock pulse occurring after the event. Integration of the signal generated by the flip-flop yields an analog signal having an amplitude proportional to the first error interval. A second possible error interval, occurring between the last counted clock pulse and the second event, is measured by first detecting the occurrence of the second event. Then, a delayed version of the second error interval is measured by setting a flip-flop with the first clock pulse generated after the occurrence of the second event and resetting the flip-flop with a signal representative of the second event delayed by a period equal to the interval between clock pulses. Again, integration of the signal generated by the flip-flop yields an analog signal having an amplitude proportional to the second error interval. The signals representative of the first error interval, second error interval and pulse count are combined to yield an accurate measure of the interval between the two events.

Alternatively, measurements of the error intervals may be indicated numerically by utilizing meters, digital or otherwise. Then, the error interval measurements may be visually combined with the gated-clock counter output to yield the desired interval measurement.

BRIEF DESCRIPTION OF THE DRAWING

The invention will be more fully apprehended from the following detailed description of an illustrative embodiment thereof read in connection with the appended drawings in which:

FIG. 3 depicts details of the $\Delta_1$ measurement unit utilized in the measurement system of FIG. 2;

FIG. 4 shows details of the $\Delta_2$ measurement unit utilized in the measurement system of FIG. 2; and FIG. 5 is a graphical representation of a timing sequence useful in describing the operation of the $\Delta_2$ measurement unit of FIG. 4.

DETAILED DESCRIPTION

Figure 1:
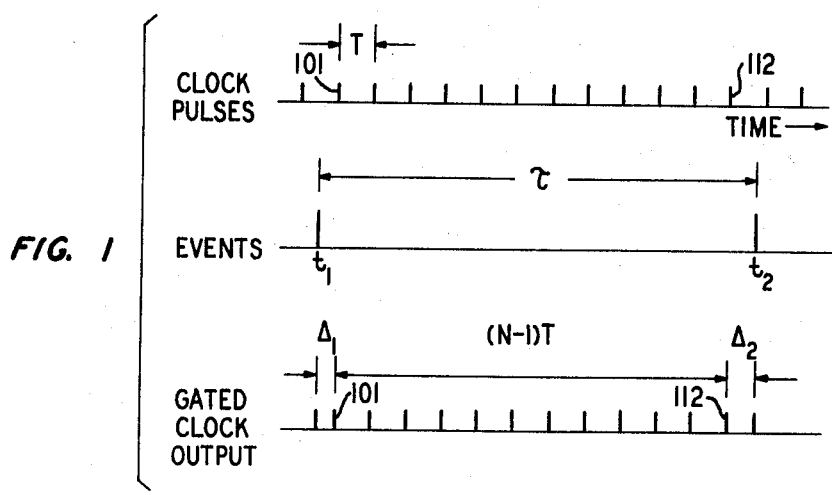
FIG. 1 is a graphical representation of a timing sequence useful in describing the invention.

FIG. 1 shows a timing sequence illustrating errors which may occur in gated-clock time interval measurements. Gated-clock apparatus is generally used to measure the time interval between the occurrence of consecutive events. For example, interval $\tau$ between events $t_1$ and $t_2$ is measured by counting a number of precisely spaced clock pulses which occur during that interval. Since events $t_1$ and $t_2$ are used to control the pulse count, errors result in the time measurement when the events do not coincide exactly with the clock pulses. As shown in FIG. 1, one possible error, namely $\Delta_1$, is equal to the interval between the occurrence of event $t_1$ and the first counted clock pulse, 101, and a second possible error, namely $\Delta_2$, is equal to the interval between the last counted clock pulse, 112, and event $t_2$. Therefore, an accurate measurement of interval $\tau$ involves accurate measurements of intervals $\Delta_1$ and $\Delta_2$ in addition to the interval determined by the number of pulses counted. That is, $$\tau = \Delta_1 + (N-1)T + \Delta_2,$$

where $N$ is the number of pulses counted and $T$ is the interval between pulses.

Figure 2:
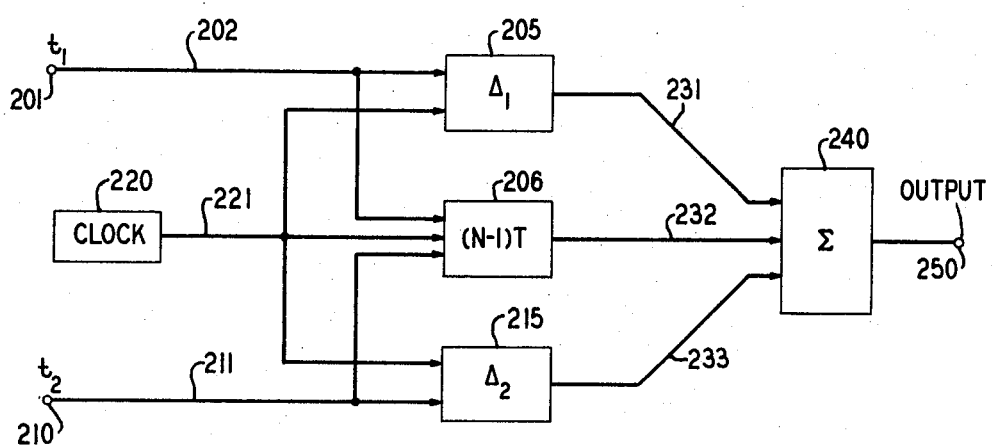
FIG. 2 shows in simplified block diagram form a time interval measurement system illustrating the invention.

FIG. 2 depicts in simplified block form a time interval measurement system illustrating the principles of the invention. The invention is concerned with obtaining a precise measurement of the time interval between the occurrence of events $t_1$ and $t_2$, namely interval $\tau$ (FIG. 1). Accordingly, a signal representative of event $t_1$, for example, a pulse signal or the like, is supplied via terminal 201 (FIG. 2) and circuit path 202 to one input of $\Delta_1$ measurement unit 205 and to one input of $(N-1)$ measurement unit 206. Similarly, a signal representative of event $t_2$, which may also be a pulse signal or the like, is supplied via terminal 210 and circuit path 211 to one input of $\Delta_2$ measurement unit 215 and to a second input of $(N-1)T$ measurement unit 206. Precision clock pulses generated in clock 220 are supplied via circuit path 221 to a second input of measurement unit 205, a third input of measurement unit 206 and a second input of measurement unit 215. Details of $\Delta_1$ measurement unit 205 and $\Delta_2$ measurement unit 215 are shown in FIGS. 3 and 4, respectively, to be described below.

Measurement unit 206 yields a measure of interval $(N-1)T$ (FIG. 1), where $N$ represents the number of pulses generated by clock 220 between the occurrence of events $t_1$ and $t_2$, and $T$ represents the interval between pulses. Any of the numerous gated-clock time measurement apparatus known in the art may be employed for this purpose. Apparatus is employed in unit 206 which is capable of generating an analog signal having an amplitude proportional to interval $(N-1)T$. This analog signal generation is accomplished simply by using a digital-to-analog converter in conjunction with the counter generally used in gated-clock measurement apparatus. However, the digital output of the gated-clock counter may be used without further electrical combination with signals generated in units 205 and 215 if desired.

Analog signals generated by units 205, 206 and 215 are supplied via circuit paths 231, 232 and 233, respectively, to summing unit 240. In accordance with the invention, unit 240 combines signals representative of $\Delta_1$, $(N-1)T$ and $\Delta_2$ to yield a precise measure of interval $\tau$ (FIG. 1) at output terminal 250. Alternatively, the analog signals generated by $\Delta_1$ measurement unit 205 and $\Delta_2$ measurement unit 215 may be read out on a digital voltmeter or the like. Then, the voltmeter indication of error intervals $\Delta_1$ and $\Delta_2$ may be combined visually or otherwise, with the counter indication of interval $(N-1)T$ to yield a precise measure of interval $\tau$. Indeed, numerous arrangements may be devised for combining the output of units 205, 206 and 215 to obtain an accurate measure of interval $\tau$.

By employing the principles of this invention, a relatively "low" frequency gated-clock time measurement system may be upgraded to the equivalent of a "high" frequency system. This upgrading, of course, is dependent upon the resolution of the apparatus used in measuring or otherwise indicating intervals $\Delta_1$, $(N-1)T$ and $\Delta_2$. Consider a system in which analog signals representing these intervals are measured using voltmeters. For example, a system using a 1 megahertz oscillator and, in which, interval $T$ is represented by an analog signal of 0.100 volts. Such a system may be upgraded to the equivalent of one using a 100 megahertz oscillator by employing voltmeters, digital or otherwise, which are capable of indicating analog signal measurements in millivolts. The elements utilized to indicate the measurements of intervals $\Delta_1$, $(N-1)T$ and $\Delta_2$ may be of a variety which is incapable of high-speed action, i.e., their response time may be slow. In the practice of this invention, however, high-speed measurement elements are not required. Indeed, the equivalent of high-speed action, i.e., response time, is achieved by combining the outputs of low-speed measurement elements, thereby minimizing cost of the system.

FIG. 3 shows in simplified block diagram form details of $\Delta_1$ measurement unit 205. Unit 205 is utilized to obtain an accurate measure of the interval between the occurrence of event $t_1$ and the first clock pulse counted in unit 206 (FIG. 2), namely, interval $\Delta_1$ (FIG. 1). This measurement is achieved by utilizing a bistable switching circuit, namely flip-flop 301. Accordingly, a signal representative of event $t_1$ is supplied via circuit path 202 to the set input of flip-flop 301 and pulse signals generated by clock 220 (FIG. 2) are supplied via circuit path 221 to the reset input of flip-flop 301. Operation of flip-flop 301 is straightforward. The signal representing event $t_1$ causes the output of flip-flop 301 to switch from an initial low state to a high state. Once flip-flop 301 is set by event $t_1$, its output remains high until reset by a clock pulse. Thus, a pulse signal representative of the interval between event $t_1$ and the next generated clock pulse is generated by flip-flop 301. This pulse signal is supplied via circuit path 302 to integrator 303. In turn, integrator 303 yields an analog signal having an amplitude which is directly proportional to error interval $\Delta_1$. Although any of the numerous integrators known in the art may be used in practicing this invention, it is preferred that an integrator is utilized which has the capability to "hold" the analog representation of interval $\Delta_1$ for subsequent combination with signals representative of intervals $(N-1)T$ and $\Delta_2$. Alternatively, summing unit 240 (FIG. 2) may include a holding circuit. Apparatus which may be employed in $\Delta_1$ measurement unit 205 is described in U.S. Pat. No. 3,534,271 issued Oct. 13, 1970.

FIG. 4 depicts in simplified block diagram form details of $\Delta_2$ measurement unit 215. Unit 215 is utilized to obtain an accurate measure of the interval between the last clock pulse counted in unit 206 (FIG. 2) and the occurrence of event $t_2$, namely interval $\Delta_2$ (FIG. 1). Since event $t_2$ occurs after the "last" clock pulse clocked in unit 206, it is necessary first to detect the occurrence of event $t_2$ prior to initiating the measurement of interval $\Delta_2$. Therefore, unit 215 operates to measure an interval, $\Delta'_2$, which is equal to interval $\Delta_2$ but delayed by interval $T$. FIG. 5 shows a timing sequence illustrating the operation of $\Delta_2$ measurement unit 215 of FIG. 4.

Referring to FIG. 4, clock pulses generated at equal intervals $T$ by clock 220 (FIG. 2) are supplied via circuit path 221 to one input of AND gate 401. Operation of gate 401 is inhibited until the occurrence of event $t_2$. Then, AND gate 401 operates only to pass the next clock pulse generated after the occurrence of event $t_2$, namely pulse 112' (FIG. 5). Flip-flop 402 (FIG. 4) is used to control AND gate 401. Accordingly, a signal representative of event $t_2$ is supplied via circuit path 211 to the set input of flip-flop 402 and to delay unit 403. Unit 403 operates to generate signal $t'_2$, which represents event $t_2$ delayed by interval $T$. Delayed event signal $t'_2$ is supplied via circuit path 406 to the reset input of flip-flop 402. Operation of flip-flop 402 is straightforward. In response to signals representative of $t_2$ and $t'_2$, flip-flop 402 generates a high state signal for a period equal to interval $T$ between $t_2$ and $t'_2$. The output of flip-flop 402 is supplied to a second input of AND gate 401. Operation of AND gate 401 is such that only pulse 112' is supplied to the set input of flip-flop 410. Thus, operation of flip-flop 410 is inhibited until the occurrence of event $t_2$ is detected. Delayed event signal $t'_2$ is supplied via circuit path 411 to the reset input of flip-flop 410.

Operation of flip-flop 410 is also straightforward. Pulse 112' causes the output of flip-flop 410 to switch from an initial low state to a high state. The output of flip-flop 410 remains high until delayed event signal $t'_2$ resets flip-flop 410 causing the output to go low. Thus, a pulse signal is developed at the output of flip-flop 410 which represents interval $\Delta_2$. This pulse signal is supplied to integrator 420 which, in turn, generates an analog signal having an amplitude directly proportional to interval $\Delta_2$. Flip-flop 410 and integrator 420 are essentially identical to flip-flop 301 and integrator 303 shown in FIG. 3. Accordingly, the apparatus described in U.S. Pat. No. 3,534,271 cited above may also be utilized in $\Delta_2$ measurement unit 215.

What is claimed is:

1. In a time interval measurement system of the gated-clock type in which pulse signals generated by a clock circuit during an interval between the occurrence of a first event and a second event are counted, the improvement which comprises, first flip-flop means for generating a first pulse signal representative of the interval between the first event and the first one of said clock pulses generated between said events, first integrator means for generating a signal having an amplitude proportional to the duration of said first pulse signal, means for delaying a signal representative of said second event for a predetermined interval, second flip-flop means responsive to said second event signal and said delayed signal for generating a first control signal, coincidence gate means responsive to said first control signal and to said clock pulses for generating a second control signal, third flip-flop means responsive to said second control signal and to said delayed signal for generating a second pulse signal representative of the interval between the last one of the clock pulses generated between said events and said second event, and second integrator means for generating a signal having an amplitude proportional to the duration of said second pulse signal, wherein the signals generated by said first and second integrator means are utilized in conjunction with the number of clock pulses counted to yield a precise measure of the time interval between said events.

2. Time interval measurement apparatus as defined in claim 1 further including means for combining a signal representative of said pulse count and the signals generated by said first and second integrator means to yield a measure of said time interval.

3. Apparatus for measuring the time interval between the occurrence of first and second events which comprises, clock means for generating pulse signals at predetermined intervals, means responsive to signals representative of said first and second events for counting the number of clock pulses generated between the occurrence of said events, first flip-flop means for generating a first pulse signal representative of the interval between said first event and the first one of said clock pulses generated between said events, first integrator means for generating a signal having an amplitude directly proportional to the duration of said first pulse signal, means for delaying a signal representative of said second event for a predetermined interval, means responsive to said second event signal and to said delayed signal for generating a first control signal, means responsive to said first control signal and to said clock pulses for generating a second control signal, means responsive to said second control signal and said delayed signal for generating a second pulse signal representative of the interval between the last one of the clock pulses generated between said events and said second event signal, and second integrator means for generating a signal having an amplitude directly proportional to the duration of said second pulse signal, wherein the signals generated by said first and second integrator means are utilized in conjunction with the number of clock pulses counted to yield a precise measure of the time interval between said events.

4. Time interval measurement apparatus as defined in claim 3 further including means for combining a signal representative of the number of clock pulses counted and signals generated by said first and second integrator means to yield a measure of the time interval between said events.

* * * * *